United States Patent

[11] 3,614,438

| [72] | Inventor | Gary L. Knowlden<br>Torrance, Calif. |
|---|---|---|
| [21] | Appl. No. | 459,618 |
| [22] | Filed | May 28, 1965 |
| [45] | Patented | Oct. 19, 1971 |
| [73] | Assignee | Hughes Aircraft Company<br>Culver City, Calif. |

[54] TARGET MOTION DETECTION FOR INFRARED SEARCH SYSTEMS
4 Claims, 8 Drawing Figs.

[52] U.S. Cl. .................................................... 250/83.3 HP
[51] Int. Cl. ....................................................... G01s 9/64
[50] Field of Search .......................................... 250/83.3
IR, 203, 83.3 TR; 178/6.8; 313/65; 343/7.7

[56] References Cited
UNITED STATES PATENTS

| 2,842,760 | 7/1958 | McLucas ..................... | 250/83.3 IR |
| 2,951,160 | 8/1960 | McCartney ................... | 343/7.7 X |
| 3,051,947 | 8/1962 | Engel ........................... | 343/7.7 |

OTHER REFERENCES

Jensen: " Area Moving Target Indication"; abstract Nov. 20, 1951 copy in 343/7.7 1 page Primary Examiner—Rodney D. Bennett, Jr.
Assistant Examiner—Richard E. Berger
Attorneys—James K. Haskell and Robert Thompson ABSTRACT: An infrared moving target-detecting system which may detect movement in three dimensions has an optically scanning receiver driven by servos which are controlled by a search programming device. The received infrared signals are converted into electrical form and are processed, utilizing a storage tube, so as to activate a display showing only the signals from sources that are moving.

FIG. 2.

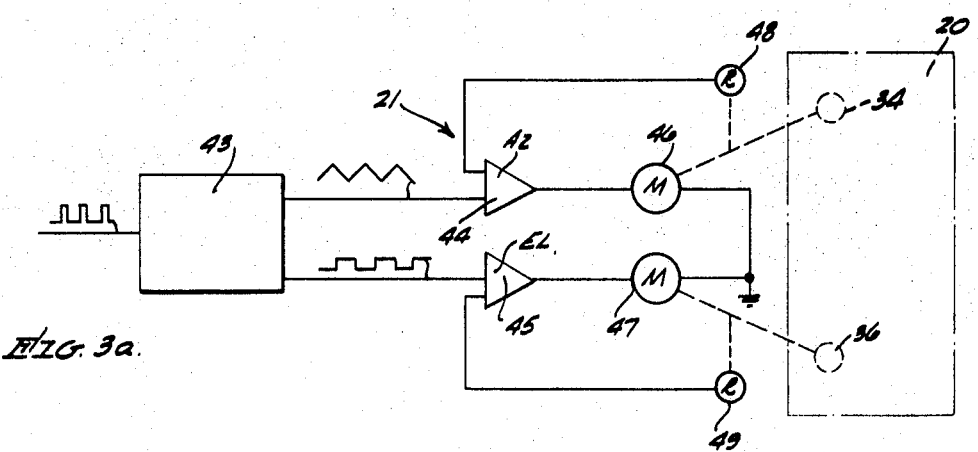
FIG. 3a.
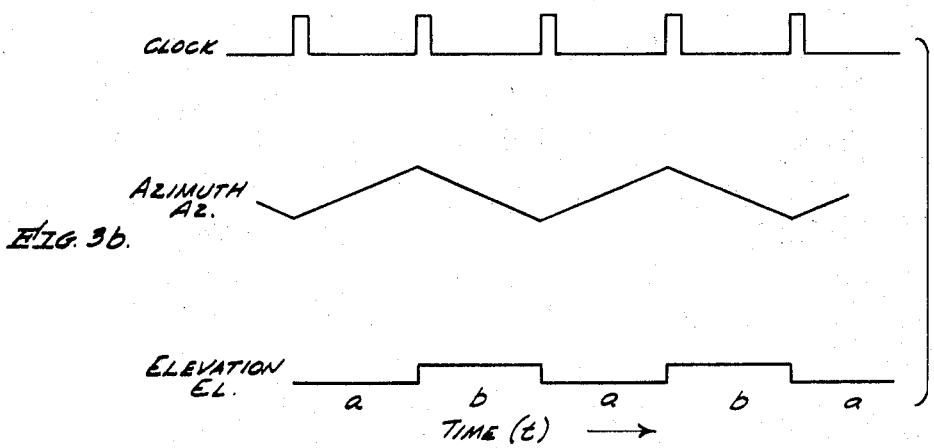
FIG. 3b.
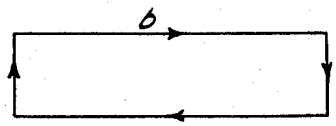
FIG. 3c. TWO BAR SEARCH PATTERN
INVENTOR
GARY L. KNOWLDEN,
BY
Robert Thompson
ATTORNEY

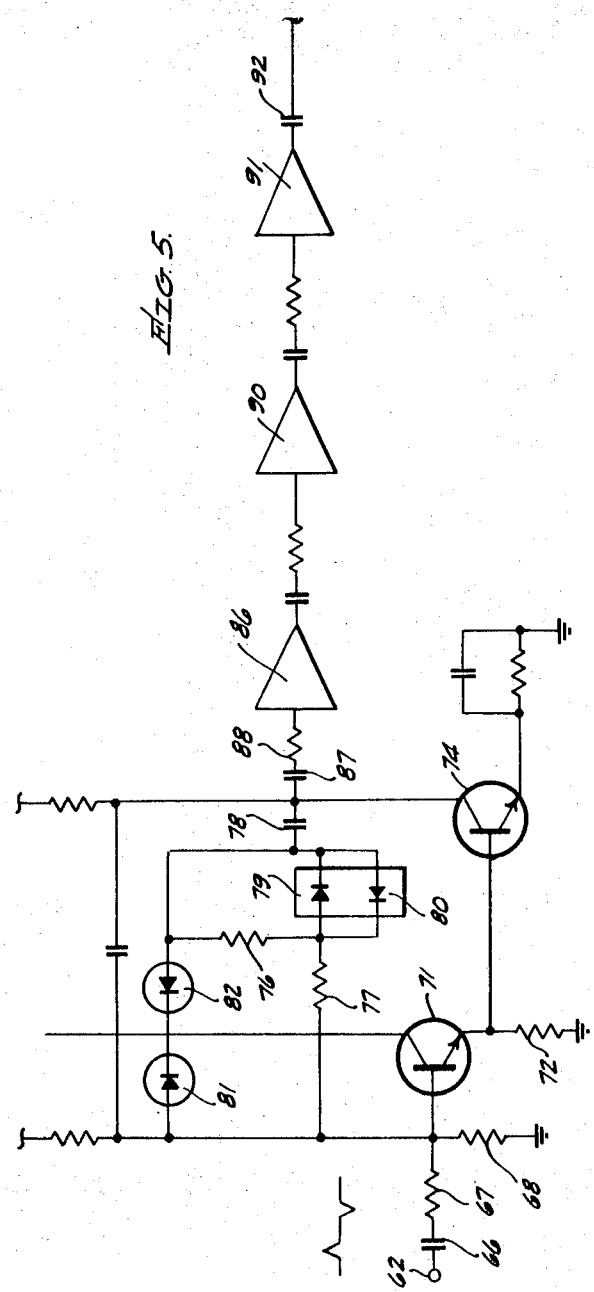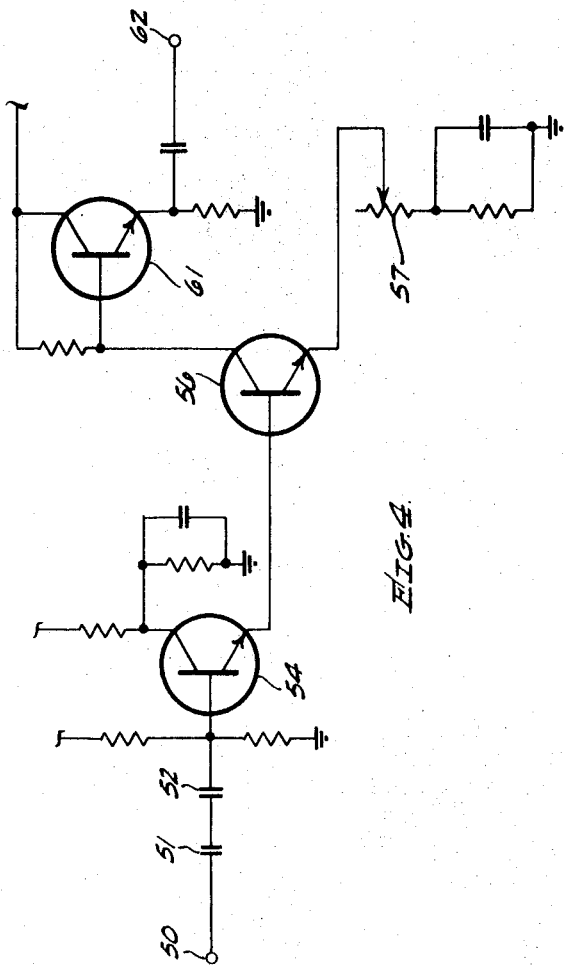

TARGET MOTION DETECTION FOR INFRARED SEARCH SYSTEMS

This invention relates generally to infrared detection and relates more particularly to an improved infrared detection system that is capable of distinguishing between moving targets and background clutter.

For many applications, detection of the presence and position of objects can be achieved by sensing the infrared radiation normally emitted or reflected from the objects. One limitation of such infrared detection is that substantially every object or source emits or reflects infrared radiation. Consequently, any infrared radiation emitted or reflected from low-flying objects, such as aircraft, missiles etc., tend to be indistinguishable from infrared background clutter from the ground, trees, water, etc. This is especially true where the detector is a ground-to-air installation and the targets are low-flying aircraft.

Accordingly, it is an object of this invention to emphasize targets by deemphasizing background clutter.

Another object is to passively detect objects moving in space relative to a detector reference point within background clutter that is substantially stationary relative to the detector reference point.

Yet another object is to provide a passive detector which is able to detect targets that maintain the same relative spatial coordinate positions (elevation and azimuth) but are moving directly toward or directly away from the detector.

A further object is to provide a system capable of displaying slow-moving targets, such as observation aircraft, that move only a slight distance during a scan interval but not capable of displaying slightly moving trees, background shimmer, etc.

Still another object is to provide an infrared detector that has a high degree of target movement resolution and the attendant advantages of being able to quickly distinguish between separate targets which are close to one another but separating from one another.

The above and other objectives of this invention can be achieved by providing a system including: an infrared receiver having optics, infrared detectors and amplifier electronics for picking up the infrared radiation and converting it to a usable electrical signal form; servo electronics connected for positioning and moving the infrared receiver; a search programmer coupled for controlling the servo electronics; a moving target indicator (MTI) coupled to process the video information from the infrared receiver for distinguishing between the varying, received radiation from objects which move more than a predetermined amount, hereinafter also referred to as moving targets, and the nonvarying, received radiation from objects which do not move significantly over a scan interval; and a display console for converting the video output from the moving target indicator (MTI) signal processor to a visual display whereby only those objects that produce a variation of radiation at the receiver of more than a predetermined amount will be displayed.

Other objects, features, and advantages will become apparent upon reading the following detailed description and referring to the attached drawings in which:

FIG. 2 is a schematic diagram of the infrared receiver of FIG. 1;

FIG. 3a is a schematic diagram of the servo electronics and search programmer that drives the infrared receiver of FIG. 2 and FIGS. 3b-3c are graphs illustrating the control signal waveforms;

FIG. 4 is a schematic diagram of a preamplifier circuit that can be used in the system of FIG. 1;

FIG. 5 is a schematic diagram of a linear-logarithmic amplifier than can be used in the system of FIG. 1;

FIG. 6 is a block diagram illustrating the relationship of the deflection circuit for the MTI signal processor of FIG. 1.

Figure 1:
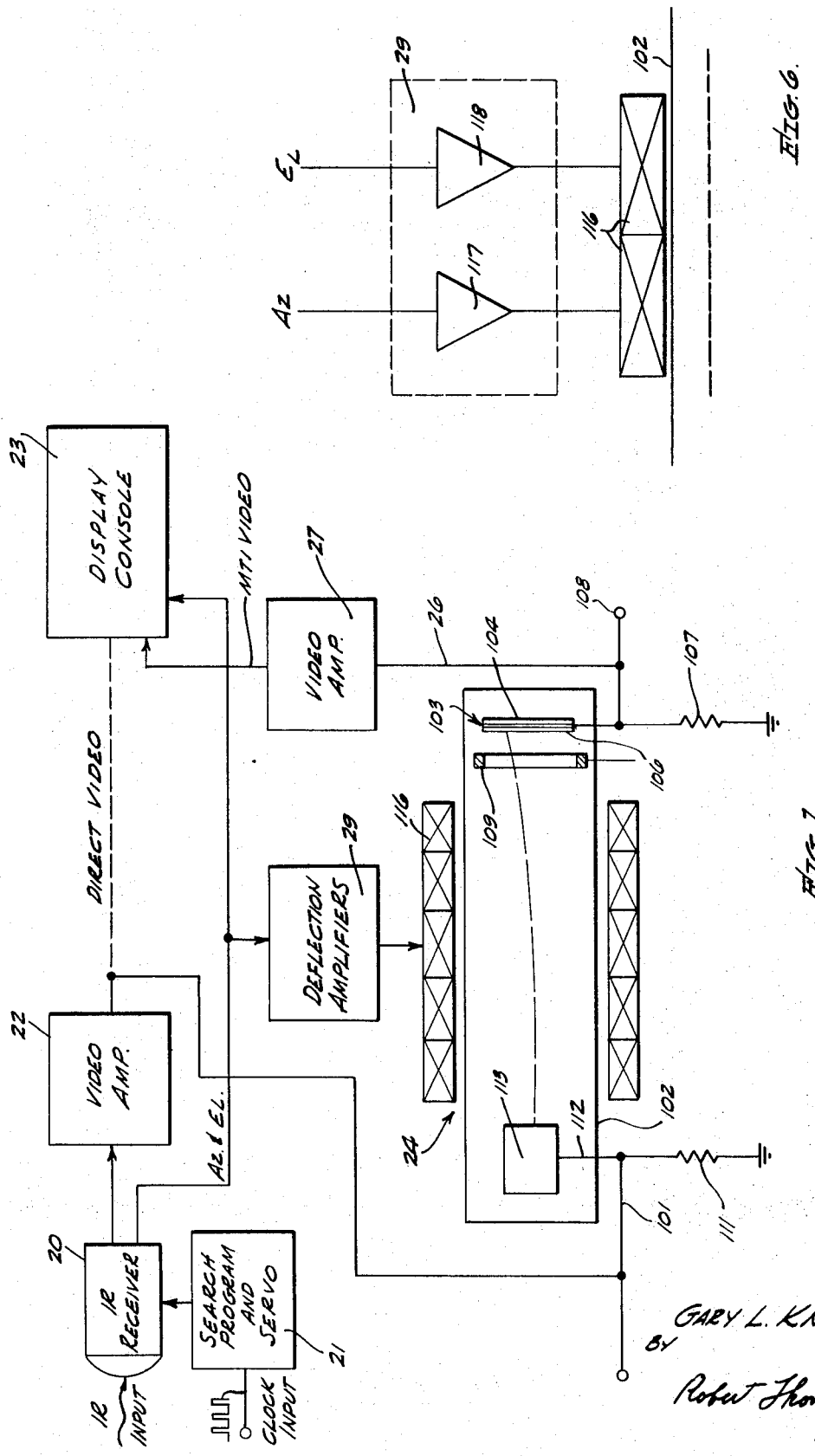
FIG. 1 is a block diagram of the improved infrared detection circuit.

Before the details of the system are described, the overall operation of the system will be described with reference to the block diagram of FIG. 1.

The infrared receiver 20 optically scans a volume of the environment in a search pattern, picks up infrared radiation from sources, and converts the received radiation to an electrical form, hereinafter arbitrarily called a video signal.

The particular search pattern is controlled by a search programmer and servo circuit 21 that generates an elevation control signal (E1) and an azimuth control signal (Az) which move the infrared receiver by means of a servo.

In order to convert the video output from the infrared receiver 20 to a more usable form, the video signal is fed to an amplifier circuit 22 that amplifies the signal and increases the dynamic range of the system and to form a direct video signal. This direct video can be fed directly to a display console 23 and is fed to a moving target indicator (MTI) signal processor circuit 24.

The direct video fed to the moving target indicator signal processor 24 is processed therein so that only that video information from sources which move in space relative to the infrared receiver 20 a sufficient amount during a search scan interval or changes in intensity will generate an output signal on the output lead 26. This output signal is then processed by an amplifier circuit 27 and changed to a form that is compatible with the display console 23.

In order to synchronize the search scan operation of the infrared receiver 20 with the scanning operation of the moving target indicator, signal processor circuit 24 and the scanning operation of the display console 23, the azimuth control signal (Az) and elevation control signal (E1) are fed directly to a deflection amplifier circuit 29 for controlling the scan operation of the moving target indicator circuit 24, and the display console 23. As a result, the video information is visually displayed on the display console 23 in geometric and time synchronism with the search operation.

Figure 2:
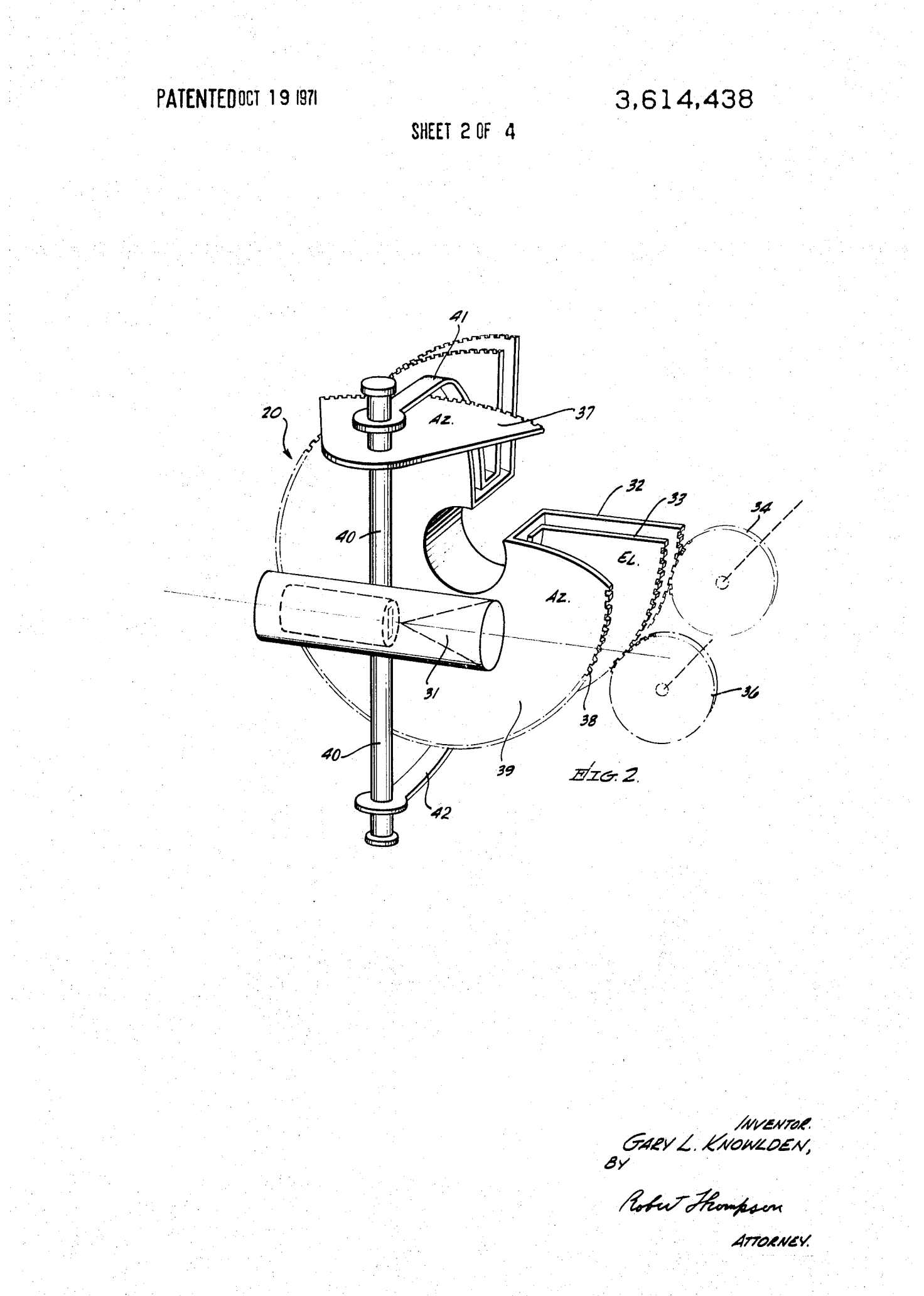

Now referring to the system in more detail, the infrared receiver 20 illustrated in FIG. 2, searches the target area with a raster bar scan pattern. To enable the infrared receiver 20 to scan in this or any other selected pattern, a seeker head 31 is gimbaled about two mutually perpendicular intersecting axes by an azimuth gear means 32 and an elevation gear means 33 which are controllably rotated about a concentric axis by an appropriate servo gear means 34 and 36, respectively.

In operation, the seeker had 31 is rotated in azimuth by rotating the azimuth control gear means 32. This rotation of the azimuth control gear 32 in turn rotates a gimbal gear 37, which meshes with gear teeth 38 formed about the periphery of a dish-shaped azimuth control gear 39. The gimbal gear 37 is secured to rotate a pivot pin 40, which is supported between the upper and the lower gimbal supports 41 and 42, through the azimuth angle. The pivot pin 40 is in turn secured to rotate the seeker head 31 through the azimuth angle. It should of course, be understood that the gear ratios of FIG. 2 may be changed and varied within any appropriate limitation and are only meant to be illustrative.

The seeker head 31 is tilted in elevation by means of the elevation gear means 33 which has the upper and the lower gimbal supports 41 and 42 secured to its hub. In operation, rotation of the servo gear 36 rotates the elevation gear, causing the seeker head 31 to nod or tilt up or down. Thus, it is possible to angularly move the seeker head 31 through any angular position through the use of two control signals.

The seeker head 31 includes a lens means or telescope and a detector element that is sensitive to radiation in the infrared spectrum. A device of this type that can be used is described and illustrated in U.S. Pat. No. 3,103,585, issued Sept. 10, 1963 to T. H. Johnson, et al. Other detectors that could be used are described and illustrated in U.S. Pat. No. 3,052,861, issued Sept. 4, 1962, to G. D. Hayball, et at., and U.s. Pat. No. 3,080,542, issued Mar. 5, 1963 to J. J. Long. As is conventional with infrared detectors, it is preferable to cool the detector element, and this can be done in accordance with the technique described in U.S. Pat. No. 2,996,893, issued Aug. 22, 1961 to J. G. Goodenough, et al. In operation, detected radiation image will be scanned across the detector element, which can be a linear array of on e or more individual detector elements of very small width and/or length, so that the radiation image will generate an electrical pulse signal or video signal each time the image is scanned across the detector material. In effect, the small dimension of the detector limits the instantaneous scan to a narrow beam. Of course, it should be understood that when a plurality of detector elements are used, the video signals would be either multiplexed or else multiple video channels provided.

As previously stated, the infrared receiver 20 is driven by the servo gears 34 and 36. These servo means are controlled by means of the search programmer and servo circuit 21, illustrated in FIG. 3a. The search programmer circuit 43 is controlled by means of a clock pulse input which can have a frequency of 8 cycles per second. It should of course be understood that other clock frequencies could be used and this particular frequency is used only for descriptive purposes. The search programmer 43 operates on the clock pulses and generates an azimuth control signal (Az) and an elevation control signal (E1). These two control signals (FIG. 3b) can be generated by means of a plurality of flip-flops arranged in a count down flip-flop circuit, one flip-flop output is integrated to generate a triangular waveform azimuth control signal (Az), in which the pulse changes from a negative slope to a positive slope and vice versa at each input pulse. The elevation control output (E1) can be formed by summing the outputs of the flip-flops, in accordance with the principles disclosed in U.s. Pat. No. 2,709,770, issued on May 31, 1955, to S. Hansen, so that a square wave pulse having a duration equal to the pulse interval and duration of a clock pulse is generated.

In the embodiment described, the elevation control signal (E1) is illustrated as a series of square waves and, in effect, drives the infrared receiver in the two bar raster scan pattern of FIG. 3c. Of course, it should be understood that a multiple raster scan, such as four or more, could be generated by using more flip-flop stages in the search programmer 43, and summing the outputs of these flip-flops to generate a staircase waveform.

The azimuth control signal (Az) and the elevation control signal (E1) are fed to servoamplifiers 44 and 45, respectively, where they are chopped at 400 cycles per second to drive the servomotor 46 and 47. One servoamplifier that could be used is described and illustrated in the *General Electric Transistor Manual*, Seventh Edition, page 225, FIG. 9.14. A servomotor that could be used is described and illustrated in *Control Systems Engineering*, by C. Savant in Chapter 9. The servomotor 46 and 47 drives the servo gear means 34 and 36 to control the operation of the infrared receiver 20 (FIG. 2). In addition, the output shafts of the servos 46 and 47 drive an azimuth resolver 48 and an elevation resolver 49 to generate a feedback signal for the azimuth servoamplifier 44 and the elevation servoamplifier 45, whereby the system response can be controlled.

The video signal from the infrared detector in the seeker head 31 is fed to the amplifier circuit 22, which includes a preamplifier stage (FIG. 4) and a linear-logarithmic amplifier stage (FIG. 5) connected in series with one another.

Referring to the preamplifier stage illustrated in FIG. 4, the low-amplitude negative and positive polarity video pulses from the detector element are applied to an input terminal 50, through a pair of coupling capacitors 51 and 52, and to the base of an input stage emitter follower transistor 54. The emitter follower transistor 54 directly coupled to the base of an amplifier stage transistor 56 and provides an impedance match between the infrared detector and the amplifier stage. An adjustable resistor 57 is connected between the emitter terminal of the amplifier stage transistor 56 and a reference potential terminal of a voltage source (not shown) for producing a negative feedback signal which provide circuit stability and gain adjustment for the amplifier stage. By making the gain of the amplifier transistor 56 adjustable it is also possible to insure balanced preamplifier outputs for each channel in those instances where more than one detector element is used. The collector terminal of the amplifier stage transistor 56 is directly coupled to the base terminal of an output stage emitter follower 61 which in turn provides impedance matching between the amplifier stage and the output terminal 62 to the logarithmic amplifier stage. The amplified pulses are thus fed through the output stage emitter follower 61 to the logarithmic amplifier.

The amplified positive polarity and negative polarity video pulses are fed to a linear-logarithmic amplifier circuit and converted to a more usable form and then full wave rectified at the output. Referring to FIG. 5, the first logarithmic amplifier circuit stage is illustrated in a schematic diagram form and the following three stages of logarithmic amplifier in block diagram form. It should be noted that the block diagram stages are substantially identical to the circuit of the first stage.

In operation, pulse signals from the preamplifier are received at input terminal 62 and fed through a differentiating circuit including a capacitor 66 and a pair of resistors 67 and 68 to convert the pulse information to positive and negative pulse spike waveforms. This differentiated signal is thereafter applied to the base terminal of an input stage emitter follower transistor 71 whereupon the voltage signal developed across an emitter resistor 72 is applied to the base terminal of a directly coupled common emitter amplifier stage transistor 74.

A feedback loop is connected between the collector terminal of the amplifier stage transistor 74 and the base terminal of the input stage emitter follower transistor 71 to control the amplification of the logarithmic amplifier in accordance with the amplitude of the input pulses. More specifically, the feedback loop includes two feedback resistors 76 and 77 which are AC coupled to the output stage collector by coupling capacitor 78. By shunting one feedback resistor 76 with a parallel pa pair of oppositely polarized diodes 79 and 80, the initial forward resistance of these diodes is sufficiently high relative to the resistance of resistor 76 that the feedback signal passes through the feedback path formed by resistors 76 and 77 for very low-amplitude signals. When, however, the feedback signal exceeds a certain level, one of the appropriate diodes 79 or 80 forward conducts with a logarithmic characteristic to shunt the feedback resistor 76 and to feed the feedback signal through the feedback resistor 77. Thus, the first stage logarithmic amplifier amplifies the input signal linearly for very low-signal levels and logarithmically for signals above a predetermined level. In order to handle very large feedback signals the feedback resistors 76 and 77 are in turn shunted with a pair of oppositely polarized Zener diodes 81 and 82 which break down to shunt the resistor when the feedback signal exceeds a predetermined level, thereby obtaining an amplifier gain of unity at the higher signal ranges.

Now referring to the block diagram stages of the linear-logarithmic amplifier, the second stage logarithmic amplifier 86 is identical to the previously described first stage and is coupled in series circuit by a coupling capacitor 87 and a resistor 88. The following two logarithmic amplifier stages 90 and 91 are substantially identical to the first two stages with the exception that the Zener diodes are omitted.

The direct video from the last stage of the linear-logarithmic amplifier may be fed through the coupling capacitor 92 directly to the display console 23 for optional presentation as "raw" video and is fed directly to the electrical input terminal 101 of the moving target indicator (MTI) signal processor 24.

The function of the MTI signal processor is to pass signals from moving targets while canceling signals from relatively nonmoving clutter sources, such as terrain background or clouds. This amplification of signals that move at least a predetermined amount and cancellation of unwanted clutter that does not move a predetermined amount is accomplished in the following manner. The beam of the moving target indicator (MTI) storage tube 102 is deflected by the azimuth signal (Az) and the elevation signal (E1) through the deflection amplifiers 29 so that the electron beam is caused to sweep out a search pattern in exact geometric synchronism with the seeker head search pattern on the face of a target electrode 103. When the direct video signal indicates that a target has been scanned in the search pattern, the video signals intensity modulate the electron beam in the MTI storage tube 102 in such a manner as to deposit proportional electron charges on the face of the target electrode 103. The target electrode 103 includes a backing sheet 104 of electrically conducting material, such as nickel, and a coating 106 of leaky dielectric material characterized by having a secondary emission less than unity and a high capacitance and resistance to provide a static decay rate or RC time constant sufficient to hold the electron charge slightly longer than the time between scan intervals. A coating of material having these characteristics is a first layer of highly resistive semiconductor material such as selenium, which is a P-type conductor, and a layer of cadmium selenide, which is an N-type conductor wherein the interface between layers forms a rectifying barrier. The layer of cadmium selenide is bonded to the backing sheet 104. An MTI storage tube that could be used is the Hughes Aircraft Company's NO. H–1130, illustrated and described in the Hughes Aircraft Company publication entitled *MTI DEVICE* and identified as CRST–45/2M/GL/12–64.

Although the exact operational theory of this storage tube is not known, the target electrode can be likened to an array of a large number of theoretical capacitors connected in parallel with a resistor. In operation, as the electron beam scans across these theoretical capacitors when a video signal is present, a current flows, producing an electrical signal at a load resistor 107 and, at the same time, charging the theoretical capacitor. As the beam moves on in the raster scan, a charge is left on the theoretical capacitor while leaving the theoretical capacitor open circuited. The next time the search pattern scans this same raster line, the electron beam again crosses this theoretical capacitor. If the electron beam is modulated by a video signal of a target that has not moved during the scan interval, the beam cannot deposit any additional electron charge on the theoretical capacitor because of the equal electron charge left there by the previous scan. As a result, no current flows in the theoretical RC charging circuit. This operation is repeated on all subsequent scan rasters so that the video signals for stationary infrared targets are canceled. In the case of moving targets, however, the video signal modulated electron beam will either change in intensity and/or fall on a different area of the target electrode 103. This change in the modulated beam results in an electron charge being increased or deposited on different theoretical capacitors, respectively, causing a current to flow through the load resistor 107, whereby an output signal is generated on the output line 108. As is conventional with this type of MTI storage tube, a collector 109 is mounted in front of the target face to control any secondary electron emission.

The electron beam intensity modulation and deflection operations are accomplished in the following manner.

For intensity modulation, the direct video signal from the amplifier circuit 22 is applied to the input terminal 101 of the MTI storage tube 102 to vary the voltage across an input resistor 111. A control electrode lead 112 is connected from the junction of the resistor 111 and the input lead 101 to an electron gun 113 whereby variations in the input signal modulates the intensity of the electron beam projected from the gun.

Beam deflection is accomplished by feeding the azimuth signal (Az) and the elevation signal (E1) to the deflection coils 116 through the deflection coil driver amplifiers 117 and 118, respectively, in the manner illustrated in FIG. 6. The deflection coils 116 can be standard vidicon deflection coils that are matched to the MTI storage tube 102 and to the amplifiers 117 and 118. One type of deflection coil driver amplifier that can be used is described and illustrated in the "Handbook of Operational Amplifier Applications" edited by Burr-Brown Research Corporation, Tucson, Arizona, Copyright 1963, First Edition, Second Printing, wherein the design principles are disclosed on pp. 4–15 and the deflection coil driver circuit is illustrated on p. 65. In operation, the azimuth signal and the elevation signal deflect the electron beam in the raster bar scan pattern of FIG. 3c, or any other scan pattern, that the seeker head makes. It should of course be understood that the azimuth signal (Az) and the elevation signal (E1) fed to the deflection amplifiers can be received directly from the search programmer 43 or from the resolvers 48 and 49, illustrated in FIG. 3a.

Referring back to the MTI signal processor circuit, the MTI output signal developed on output terminal 108 is fed to the amplifier 27 over the output lead 26. The amplifier 27 can include a preamplifier and lin-log amplifier of the same type as is described and illustrated in FIGS. 4 and 5. This amplifier 27 changes the MTI signal to a form that is usable by the display console 23.

The display console 23 includes a display tube in which the direct video can be written and displayed as one function and the MTI signal is written and displayed as another function. Several display tubes that could be used are the Hughes Aircraft Company's multimode storage tubes, type H–1084AP20 and H–1084BP20, which are described and illustrated in the Hughes Aircraft Company publications: CRST–18B/500/GL; CRST–353M/GL/464; and CRST–25B/1M/GL/3–.

Deflection of the electron beam in the multimode storage tube can be accomplished by means of deflection amplifiers of the type described and illustrated in "Electron Tube Circuits" by Samuel Seely, published by McGraw-Hill, 1958, Second Edition, pp. 516–521 in which a paraphase amplifier illustrated in FIG. 5–28(b) on p. 519 could be utilized for DC operation by replacing the series coupling capacitor with a parallel circuit resistance to form a voltage network.

The MTI video signal is processed by the display console 23 and intensity modulates the "write" electron beam of the multimode storage tube or display tube. As a result, the target information is displayed as a function of target radiation amplitude and target geometrical position.

While salient features have been shown and described with respect to particular embodiments, it will be readily apparent that numerous modifications may be made within the spirit and scope of the invention and it is, therefore, not desired to limit the invention to the exact details shown except insofar as they may be defined in the following claims.

1. An infrared radiation detection circuit comprising: an infrared radiation receiver having an optical means operable for mechanically scanning a space and for focusing images of received infrared radiation pattern, and an infrared radiation detector mounted to receive the focused image for generating a video signal corresponding to the received radiation; a scan programmer means for generating an azimuth scan control signal and an elevation scan control signal; servo means coupled to receive the control signals and operating in response thereto, to drive said optics means through azimuth angles and elevation angles in a repeated scan pattern in the same space in accordance with the control signals from said scan programmer means; a signal processor means including a moving target indicator means coupled to store the video signals for at least the subsequent scan coupled to receive the azimuth and elevation scan signals for geometrical synchronization of the stored video information of the moving target indicator means with the scan pattern, said moving target indicator means including an output means for generating output signals only for variation in the intensity or spatial position of radiation pattern between subsequent scans.

2. An infrared radiation detection circuit comprising: an infrared receiver including a seeker head operable for mechanically scanning a space and for focusing images of received infrared radiation, and an infrared radiation detector mounted to receive the focused images for generating a video signal corresponding to the received radiation; a scan programmer means for generating an azimuth scan control signal and an elevation scan control signal; servo means coupled to receive the control signals for operation in response thereto, said servo means being coupled to drive said optics means through azimuth angles and elevation angles in a repeated scan pattern of the same space in accordance with the control signals from said search programmer; a signal processor means including a moving target indicator means coupled to receiver and store the video signal through the subsequent scan duration and being further coupled to receive the azimuth and elevation video information stored in the signals for geometrical synchronization of the video information stored in the moving target indicator means with the scan pattern, said moving target indicator means including an output means for generating an output signal only for intensity and positional variation in the detected radiation between sequential scans; and display means coupled to receive the output signals from sad moving target indicator means and to receive the azimuth and the elevation scan signals from said search programs for displaying information corresponding to varying radiation in azimuth and elevation synchronization with the scan pattern.

3. An infrared radiation detection circuit comprising: an infrared receive having an optical means operable for mechanically scanning a space and for directing images of received infrared radiation; and infrared radiation detector mounted to receive the directed image for generating a video signal corresponding to the received radiation; a scan programmer means for generating an azimuth scan control signal and an elevation scan control signal; servo means coupled to receive the control signals for operation in response thereto, said servo means being coupled to repeatedly drive said optics means through the same azimuth angles and elevation angles in accordance with the control signals from said search programmer for repeatedly scanning the same space; a signal processor means including a storage tube electrically coupled to be modulated by the video signals and being further coupled to receive the azimuth and elevation scan signals for geometrical synchronization of the moving target indicator means with the scan pattern for storing the video information for two scan durations, said storage tubes, including an portion whereby variation in the only intensity and spatial position of detected radiation between scans develops electrical output signals corresponding to the radiation variation; and display means coupled to receive the output signals from said storage tube and to receive the azimuth and elevation scan signals for displaying the varying target information in azimuth and elevation synchronization with the scan pattern.

4. An infrared radiation detection circuit comprising: an infrared receiver including a seeker head gimbaled about two mutually perpendicular axes, mechanical means coupled to rotate said seeker head about the axes, said seeker head including an optical means operable for focusing an image of received infrared radiation, and further including an infrared radiation detector arranged in a linear array and mounted to receive the focused image for generating a video signal corresponding to the received radiation; a scan programmer means for generating a step function azimuth scan control signal and a triangular function elevation scan control signal; servo means coupled to be driven by the control signals, said servo means being coupled to drive said seeker head through azimuth angles and elevation angles in a repeated raster bar scan pattern of the same space; a signal processor means including a moving target indicator means having a semiconductor target electrode comprising layers of opposite conductivity semiconductor material which form a rectifying barrier and being disposed on an electrically conducting backing sheet, said target electrode having an RC time constant backing sheet, said target electrode having an RC time constant longer than the time interval between search scans, an electron gun for generating an electron beam which is directed toward said target electrode, said electron gun being coupled to receive the video signals from said radiation detector for intensity modulating the electron beam, deflection means coupled to receive the azimuth scan search signal for deflecting the electron beam to scan said semiconductor target electrode in geometrical synchronization with the scan pattern, and means for deriving electrical output signals from said semiconductor target electrode in response to intensity modulation variations in the scanning thereof by said electron beam.

PO-1050
(5/69)

UNITED STATES PATENT OFFICE
CERTIFICATE OF CORRECTION

Patent No. 3,614,438      Dated October 19, 1971

Inventor(s) Gary L. Knowlden

It is certified that error appears in the above-identified patent and that said Letters Patent are hereby corrected as shown below:

Column 2, line 43, "had" should be --head--;
          line 68, "U.s." should be --U.S.--.
Column 3, line 28, "U.s." should be --U.S.--.
Column 4, line 33, delete "pa".
Column 6, line 21, "CRST-353M/GL/464; and CRST-25B/1M/GL/3-." should respectively be --CRST-35/3M/GL/4-64 and CRST-25B/1M/GL/3-64.--
          line 30, after "voltage" should be --divider--;
          line 62, after "of" should be --the received--.
Column 7, line 2, "receiver" should be --receive--;
          line 3, "signal" should be --signals--;
          line 11, "sad" should be --said--;
          line 17, "receive" should be --receiver--;
          line 34, after "an" should be --output--.
Column 8, line 24, delete "backing";
          line 25, delete "sheet, said target electrode having an RC time constant".

Signed and sealed this 18th day of April 1972.

(SEAL)
Attest:

EDWARD M. FLETCHER, JR.
Attesting Officer

ROBERT GOTTSCHALK
Commissioner of Patents